United States Patent [19]

Hauser

[11] Patent Number: 4,566,852
[45] Date of Patent: Jan. 28, 1986

[54] AXIAL FAN ARRANGEMENT

[75] Inventor: Kurt Hauser, Stuttgart, Fed. Rep. of Germany

[73] Assignee: Sueddeutsche Kuehlerfabrik Julius Fr. Behr GmbH & Co. KG, Fed. Rep. of Germany

[21] Appl. No.: 475,038

[22] Filed: Mar. 14, 1983

[30] Foreign Application Priority Data

Mar. 15, 1982 [DE] Fed. Rep. of Germany ... 8207204[U]
Sep. 10, 1982 [DE] Fed. Rep. of Germany ....... 3233622

[51] Int. Cl.4 ......................... F01D 9/04; F04D 29/54
[52] U.S. Cl. .................................... 415/182; 415/207; 415/213 C; 123/41.49
[58] Field of Search .................... 415/119, 213 C, 210, 415/207, 182; 416/236 A; 123/41.49; 165/122

[56] References Cited

U.S. PATENT DOCUMENTS

| 3,173,605 | 3/1965 | Harris | 415/119 UX |
|---|---|---|---|
| 3,635,285 | 1/1972 | Davis | 415/213 C UX |
| 3,937,192 | 2/1976 | Longhouse | 415/213 C UX |
| 4,189,281 | 2/1980 | Katagiri et al. | 123/41.49 X |
| 4,211,514 | 7/1980 | Hawes | 415/213 C X |
| 4,221,546 | 9/1980 | Pabst et al. | 415/207 X |
| 4,329,946 | 5/1982 | Longhouse | 415/213 C UX |
| 4,396,351 | 8/1983 | Hayashi et al. | 415/213 C X |

FOREIGN PATENT DOCUMENTS

| 1123077 | 2/1962 | Fed. Rep. of Germany ...... 415/182 |
|---|---|---|
| 1428189 | 3/1969 | Fed. Rep. of Germany ...... 415/182 |
| 849744 | 9/1960 | United Kingdom . |
| 1502000 | 2/1978 | United Kingdom . |
| 1592719 | 7/1981 | United Kingdom . |
| 2014658 | 8/1982 | United Kingdom . |

Primary Examiner—Robert E. Garrett
Assistant Examiner—Joseph M. Pitko
Attorney, Agent, or Firm—Barnes & Thornburg

[57] ABSTRACT

An axial fan arrangement is provided, especially for the radiator of a water cooled internal combustion engine for commercial vehicles. In order to reduce noise levels without impairing fan efficiency, an air guide structure is provided which widens in the flow direction starting from adjacent the air inlet edges of the fan blades. Embodiments are included which have part of the air guide structure carried by the fan blades and other embodiments have fixed air guide structure. The contour of the air guide structure conforms to the facing contour of the fan blades.

12 Claims, 6 Drawing Figures

AXIAL FAN ARRANGEMENT

BACKGROUND AND SUMMARY OF THE INVENTION

The invention relates to an axial fan, especially for the cooler or radiator of a water cooled internal combustion engine for commercial vehicles, and of the type which includes a hub with impeller or ventilator blades and an air guide frame (shroud) or device surrounding the blades which expands or enlarges in the air exit region.

Axial fans of this general kind are known (see German published application-DE-AS 2411225). Such cooling fans as a rule generally have very high pressure losses to overcome and so are strongly throttled. Most of the cooling fans that are on the market today for commercial vehicles operate in a region from $\tau=0.07$ to 0.15, wherein $\tau$ is a so called throttle number corresponding to a ratio of the dynamic pressure, taken at the impeller ring surface, divided by the total pressure increase, whereby the total pressure increase is the combination of the dynamic pressure and the static pressure. With a strong throttling of this kind, therefore with high resistant pressure and thereby resulting small volume flow, the stream or flow separates at the hub. There then results no pure axial extending flow in the region of the fan blades, but rather a so called half axial flow by which the air is accelerated diagonally toward the outside, also if no combustion motor is arranged behind the fan. The known fans of this kind produce a relatively high noise level during operation, which noise level can be held at a lower level through the widening of the air guide frame in the direction of the exit region, as compared to arrangements without such a widening. The present invention is based upon the proposition to facilitate a further reduction of the noise level, without however changing the overall construction.

The invention comprises an arrangement wherein the expansion or widening of the air guide frame begins already in the region of the entrance edge of the fan blades and exhibits an inner contour which conforms to the outer contour of the adjacent fan blades. With this form or shape, a clear reduction in the noise level in the operating or working point of the fan is achieved without however adversely influencing the fan output.

It is advantageous if the axial length of the air guide structure is at least 40% of the axial length of the fan blades at their outer diameter. Advantageously the length of the air guide apparatus is, however, selected to be still larger. A practical embodiment of the air guide apparatus is provided with a circular or similar curved expansion or widening part, connected with a conical diffuser part at its exit side. This embodiment provides good results with respect to the noise level and with respect to the fan performance.

For the design arrangement of the air guide apparatus there are two advantageous possibilities according to the invention. The air guide structure can be constructed as a fixed fan frame which surrounds the rotating fan blades in a very simple manner. However the air guide structure can also be formed in part from the hub and the fan blade of an existing fan wheel, in the form of a guide ring fixedly connected with the ends of the fan blades. Through these measures there results a clear lowering of the sound level as compared to the known construction forms wherein the fan wheel includes an outer ring rotating therewith (see German unexamined published application DE-OS-2826697). It is advantageous if the entrance edge of the guide ring extends over the fan entrance edge against the flow direction and forms an axially extending ring part. This ring part can then be used in an especially advantageous manner so that it extends into a fixed nozzle which does not rotate and which is arranged adjacent the entrance edge of the guide ring to form an entrance opening. Thereby the main stream is stabilized in the direction of the inlet slot air which also enters between the nozzle and the rotating guide ring. A further improvement can be achieved in that the entrance nozzle is expanded in a curved form from its smallest cross section in the flow direction. The slot-and main streams are thus guided tangentially onto the expanding section of the rotating guide ring to therefore improve the introduction of the flow onto the expansion. Finally the noise conditions and the efficiency of the fan can be still further improved if the entrance nozzle encompasses the rotating guide ring from the outside. The slot air thereby travels through a 180° turn-around with corresponding throttling so that the slot losses become small. This results not only in an improvement in efficiency, but rather also in a reduction of the sound level.

These and further objects, features and advantages of the present invention will become more obvious from the following description when taken in connection with the accompanying drawing which shows, for purposes of illustration only, a single embodiment in accordance with the present invention.

DETAILED DESCRIPTION OF THE DRAWINGS

Figure 1:
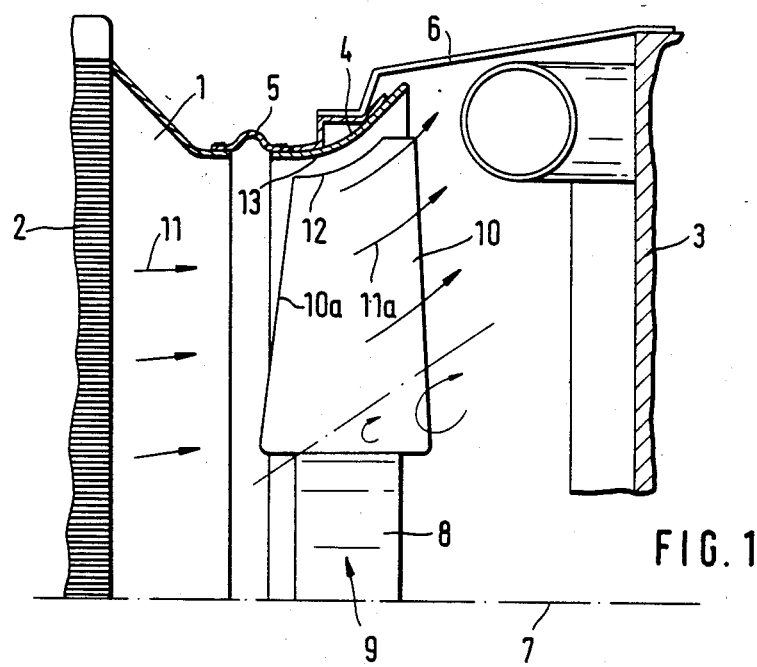
FIG. 1 is a schematic partial sectional view through an axial fan for the cooler of a water cooled internal combustion engine constructed in accordance with a first preferred embodiment of the invention.

Referring to FIG. 1, air guide apparatus in the form of a fan frame 4 is shown connected by means of an elastic seal or collar 5 to a connecting frame 1 of a cooler 2 for a water cooled internal combustion engine 3. The fan frame 4 is held by fastening arms 6 or the like with an internal combustion engine 3. The arrangement facilitates the compensation of movements between the cooler or radiator 2, which as a rule is supported on the vehicle chassis, and the internal combustion engine 3, elastically supported at the vehicle frame.

At one of the shafts 7 driven by the internal combustion engine, which is only schematically shown, the hub 8 of fan wheel 9 is supported. Fan wheel 9 includes fan blades 10 which provide for the through flow of air through the cooler 2 in the direction of the arrows 11, during absence of sufficient travelling wind force. The strong throttling resulting with this type of fan wheel 9 results in a half axial flow in the general direction of the arrows 11a.

Figure 2:
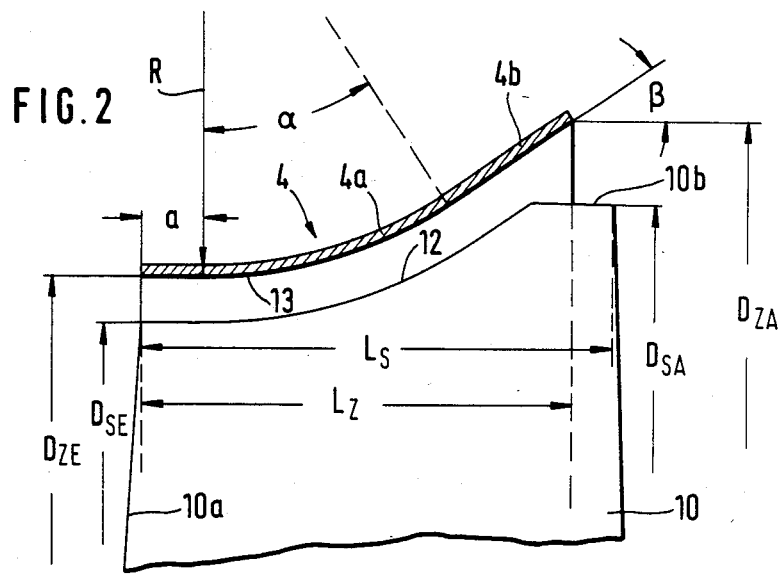
FIG. 2 is an enlarged illustration showing the contour of the frame expansion and the outer contour of a fan blade of the embodiment of FIG. 1.
Figure 3:
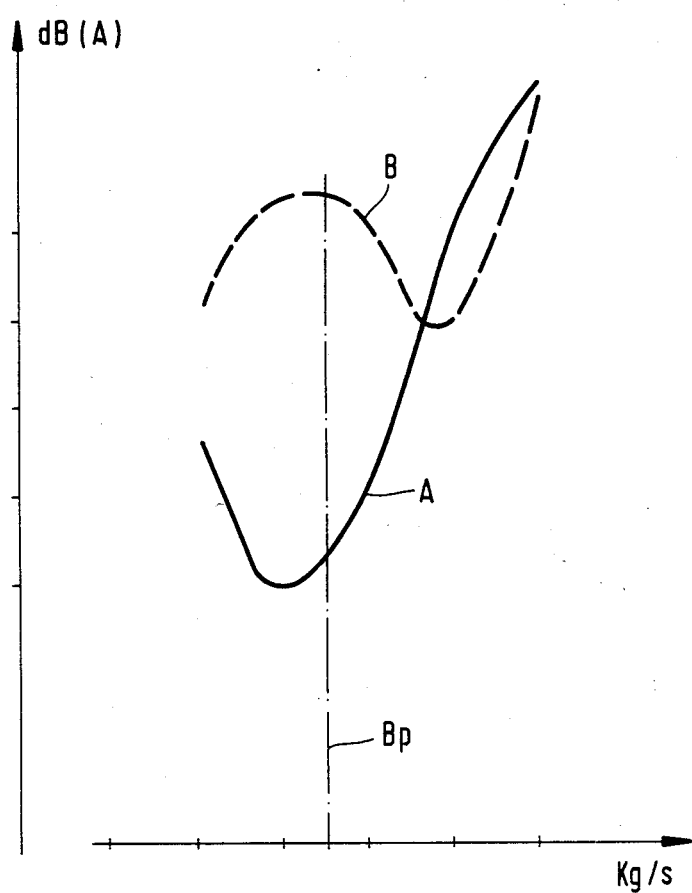
FIG. 3 is a schematic graphical depiction of the progression of the sound level in the region of the operating point of the fan, comparing fans with and without the incorporation of the arrangement of the invention.

The airflow is inventively improved in the arrangement of FIGS. 1 and 2 in that the fan frame already in the region of the entrance edge of the blades 10 is expanded in the flow direction and the outer contour 12 of each fan blade 10 conforms to the inner contour 13 of the fan frame 4, as can clearly be seen in FIG. 2. It can thereby be seen as shown in FIG. 3, that there results an especially desirable noise level relationship as compared to arrangements without such a frame widening. The simple qualitative contents of the illustration of FIG. 3 show that with air through flow in the region of the fan operating point $B_p$, the noise level A of an inventively outfitted axial fan is noticeably lower than the noise level B of a normal fan. Further, the lowest noise level A occur somewhat in the area of the fan operating point. An especially advantageous embodiment has the following characteristics: $D_{ZA}=750$ mm, $D_{SA}=724$ mm, $D_{ZE}=696$ mm, $D_{SE}=680$ mm, $\alpha=35°$, $a=10$ mm.

The ratio of $L_Z$ to $L_S$ is not permitted to be smaller than 0.4. As shown in the illustrated embodiment this ratio is advantageously somewhat larger than 0.4. From FIG. 2 it is easily seen that the widening of the fan frame 4 begins already in the region of the inlet edge of 10a of the fan blades 10. This widening begins only the short axial length "a" behind the blade inlet edges 10a. The outer contour 12 of the fan blades 10 conforms over the largest part of the axial length $L_z$ to the inner contour 13 of the fan frame 4. For fastening and transport reasons, the fan blades 10 are provided with a straight axially extending end edge portion 10b in the region of the exit edge. According to the embodiment of FIG. 2 the fan frame (shroud) 4 comprises a short cylindrical portion with the length a, a circular arc shaped part 4a, formed with the radius R extending over the angle $\alpha$ and a conical diffuser part 4B extending to the exit side and continuing from the circular arc shaped part 4A. The circular arc shaped part can also however extend over the complete axial depth of the frame according to other preferred embodiments.

Figure 4:
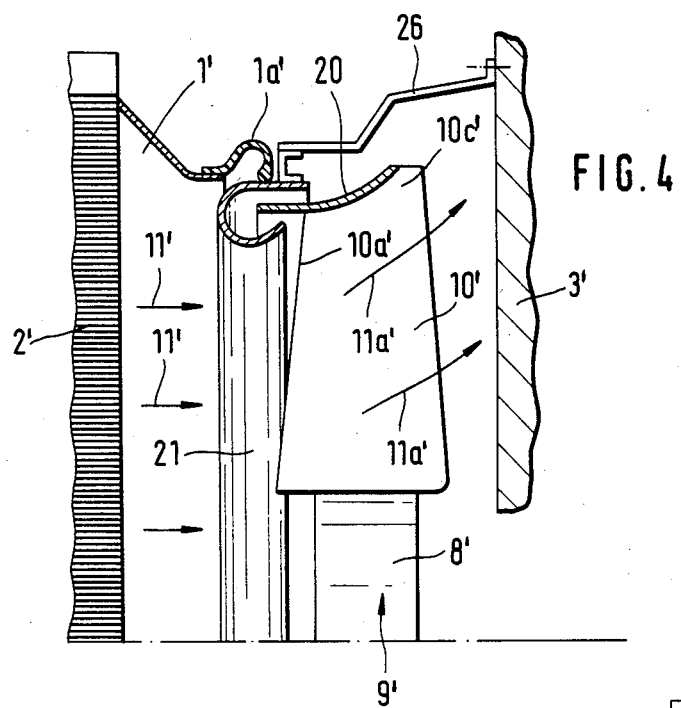
FIG. 4 is a schematic partial longitudinal sectional view through an axial fan for the cooler of a water cooled internal combustion engine, constructed in accordance with another preferred embodiment of the present invention.
Figure 5:
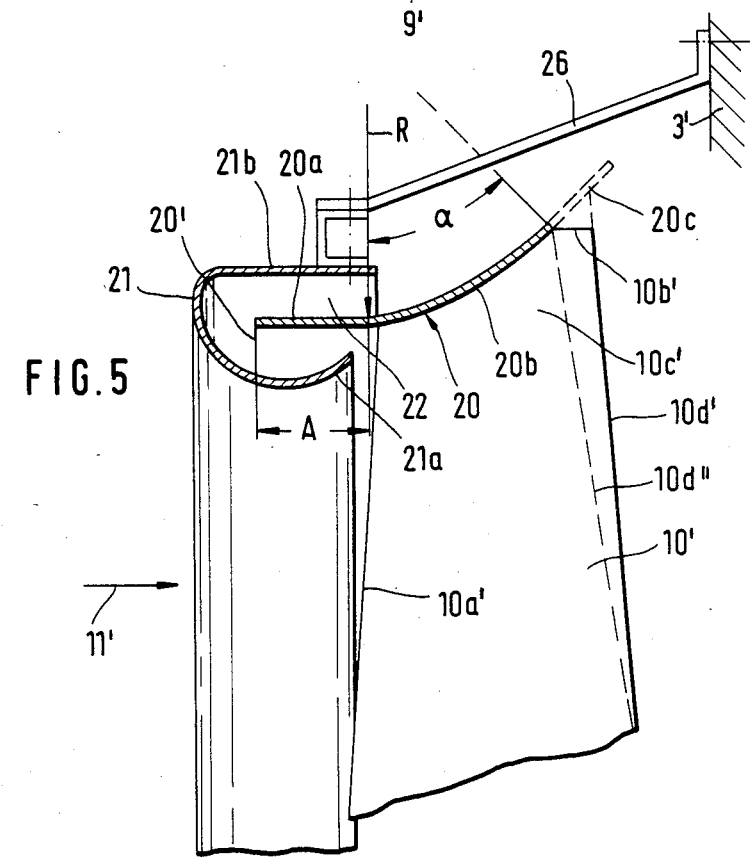
FIG. 5 is an enlarged illustration of the region of the outer edge of the fan blades of the embodiment of FIG. 4, showing the surrounding guide ring and the entrance nozzle adjacent thereto.
Figure 6:
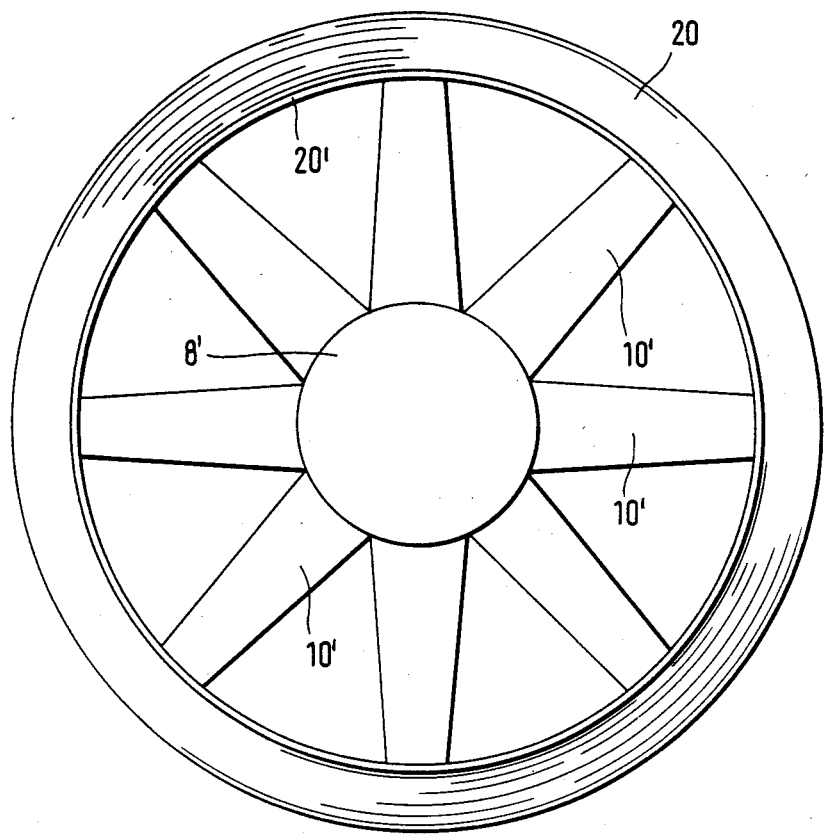
FIG. 6 is a view of the axial fan wheel of FIGS. 4 and 5, taken in the direction of the arrow 11, however without the entrance nozzle.

In FIGS. 4 to 6 there is shown a cooler or radiator 2' for a water cooled internal combustion engine 3', a connecting frame 1 and an axial fan wheel 9' carrying axial fan blades 10' on its hub 8'. Blades 10' extend radially in a usual manner from the hub 8' and are equally disposed around the circumference of this hub. The fan blades 10', upon the driving of the fan wheel 9', attend to the assistance of the through flow of the cooler 2' in the sense of the direction of the arrows 11'. The strong throttling with this type of axial fan construction results in a half axial flow of air through the fan wheel 9' in the sense of the arrows 11a'. This flow is improved by providing that in the outer ends 10c' of the fan blades 10' a guide ring 20 is fastened which serves as air guide apparatus and which rotates with the fan blades 10' and which is formed out of a cylindrical part 20a having an axial length "A" and of a circular arc shaped part 20b, which with its radius "R" extends over the angle $\alpha$. As depicted in dashed lines, this circular arc shaped part 20b can also connect into a diffuser part 20c merging with the circular arc shaped part 20b. In this case the purely axially extending end edge 10b' of the fan blade 10' is removed, as shown in dashed lines. The end edge 10d'' can also have an extension 10d''', as shown in dashed lines in FIG. 5.

In the cylindrical part 20a of the guide ring 20 an inlet nozzle 21 is disposed which is sealingly connected with respect to the frame 1 by means of an elastic lip 1a'. In the illustrated embodiment this inlet nozzle 21 is configured to narrow in the flow direction 11' until it reaches a certain cross section behind the entrance edge 20' of the guide ring 20 from which point it expands or widens so that the end region 21a is somewhat parallel to the end region of the circular arc shaped section 20b of the guide ring 20 and advantageously is disposed with a common conical envelope. The inlet nozzle 21 exhibits furthermore also a cylindrical part 21b which surrounds from the outside the cylindrical part 20a of the guide ring 20. An annular slot 22 with a connecting 180° turn-around is thus formed between the two cylindrical parts 21b and 21a. The slot air flow is strongly throttled, which in an especially advantageous manner, leads to reduction in the noise. The inlet nozzle 21 is connected at a fastening arm 26 on the motor 3' or at another fastening part. The guide ring 20 rotates with the cylindrical part 20a inside of the ring region of the somewhat U-shape formed resultant inlet nozzle 21.

Other embodiments are also contemplated, similiar to FIGS. 4 and 5, but having an inlet nozzle without the cylindrical part 21b. The illustrated embodiment of FIGS. 4 and 5 is, however, very advantageous for the foregoing reasons with respect to the through flow and the noise level. Advantageous embodiments are also contemplated where the guide ring 20 is not as shown with the cylindrical part 20a but rather only with the circular arc shaped part 20b and the conical part 20c, as the case may be.

While I have shown and described several preferred embodiments in accordance with the present invention, it is understood that the same is not limited thereto but is susceptible to numerous changes and modifications as would be known to those skilled in the art of the present disclosure and I, therefore, do not wish to be limited to the details shown and described therein but intend to cover all such changes and modifications as are encompassed by the scope of the appended claims.

I claim:

1. An axial fan arrangement especially for the cooler or radiator of a water cooled internal combustion engine for vehicles and the like, comprising:
   a rotatable fan hub,
   fan blades carried by the hub,
   and air guide structure surrounding the blades, which expands or widens toward the air exit region of the fan,
   wherein the widening of the air guide structure begins in the region of the air inlet edges of the blades, and wherein the air guiding contour of the air guide structure conforms to the contours of the fan blades,
   wherein the air guide structure is formed in part by the hub and by a guide ring fixedly connected with the ends of the blades,
   wherein a fixed nozzle protrudes in the inlet opening formed at the inlet edge of the guide ring, and wherein the inlet nozzle surrounds the tip of the guide ring.

2. An arrangement according to claim 1, wherein the expansion section of the air guide structure is configured to be of curved arc shape.

3. An arrangement according to claim 1, wherein the axial length ($L_z$) of the air guide structure is at least 40% of the axial length ($L_s$) of the blades in the region of the blade outer diameters ($D_{SA}$ respectively $D_{SE}$).

4. An arrangement according to claim 1, wherein the air guide structure is provided with an expansion part which is approximately of a circular arc shape and with a connecting conical diffuser at the exit side.

5. An arrangement according to claim 4, wherein the blades are provided in the region of their exit ends with an axially extending outer edge.

6. An arrangement according to claim 1, wherein the blades are provided in the region of their exit ends with an axially extending outer edge.

7. An arrangement according to claim 1, wherein the inlet edge of the guide ring extends axially against the flow direction beyond the fan blade inlet edge and includes an axially disposed ring part.

8. An arrangement according to claim 7, wherein the ring part is formed of cylindrical shape.

9. An arrangement according to claim 1, wherein the inlet nozzle extends outwardly over the guide ring in front of the guide ring.

10. An arrangement according to claim 1, wherein the outwardly extending part of the inlet nozzle extends parallel to the cylindrical part of the guide ring and likewise extends axially so that an annular gap with a connected 180° turn-around is formed.

11. An axial fan arrangement especially for the cooler or radiator of a water cooled internal combustion engine for vehicles and the like, comprising:

a rotatable fan hub, fan blades carried by the hub, and air guide structure surrounding the blades, which expands or widens toward the air exit region of the fan, wherein the widening of the air guide structure begins in the region of the air inlet edges of the blades, and wherein the air guiding contour of the air guide structure conforms to the contours of the fan blades, wherein the air guide structure is formed in part by the hub and by a guide ring fixedly connected with the ends of the blades, wherein a fixed nozzles protrudes in the inlet opening formed at the inlet edge of the guide ring, and wherein the inlet nozzle which protrudes into the guide ring expands in a curved shape in the flow direction from its smallest cross section advantageously located behind the inlet edge of the guide ring.

12. An arrangement according to claim 11, wherein the outwardly extending part of the inlet nozzles extends parallel to the cylindrical part of the guide ring and likewise extends axially so that an annular gap with a connected 180° turn-around is formed.

* * * * *